SELECTOR CIRCUIT

Filed Dec. 26, 1951 3 Sheets-Sheet 1

INVENTOR.
WILLIAM W. PHARIS

BY T. L. Bowes

ATTORNEY

Oct. 25, 1955 W. W. PHARIS 2,721,902

SELECTOR CIRCUIT

Filed Dec. 26, 1951 3 Sheets-Sheet 2

INVENTOR.
WILLIAM W. PHARIS

BY T. L. Bowes

ATTORNEY

Oct. 25, 1955 W. W. PHARIS 2,721,902

SELECTOR CIRCUIT

Filed Dec. 26, 1951 3 Sheets-Sheet 3

INVENTOR.
WILLIAM W. PHARIS
BY
T. L. Bowes
ATTORNEY 2,721,902
Patented Oct. 25, 1955

2,721,902

SELECTOR CIRCUIT

William W. Pharis, Rochester, N. Y., assignor, by mesne assignments, to General Dynamics, a corporation of Delaware Application December 26, 1951, Serial No. 263,400

3 Claims. (Cl. 179—18)

Figures 1, 4:
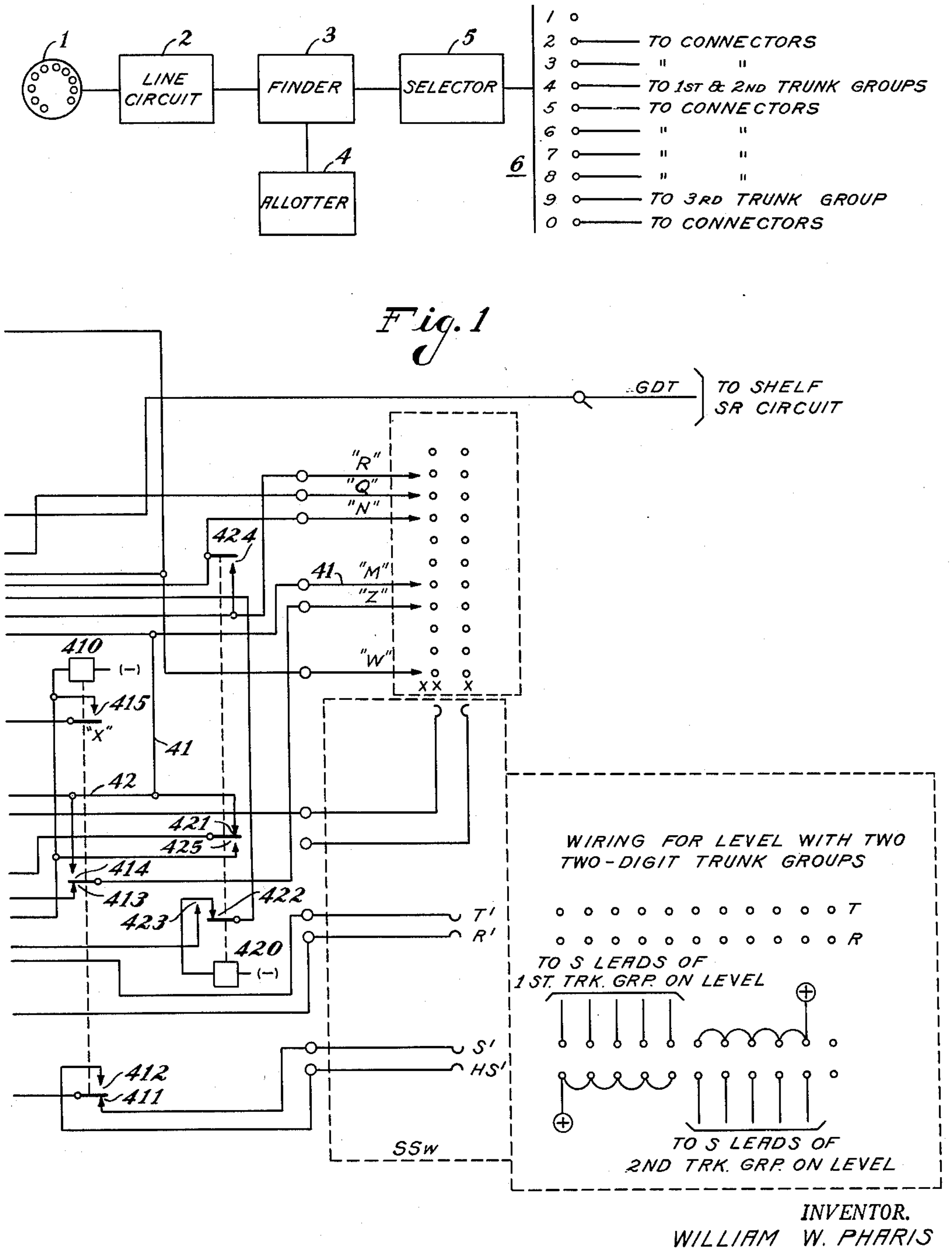

This invention relates to automatic telephone systems and more particularly to apparatus for trunk hunting in selectors used in automatic telephone systems.

It is an object of my invention to provide a new and improved trunk hunting selector.

It is another object of my invention to provide a new and improved trunk hunting selector in which trunk hunting is accomplished in a plurality of trunk groups in a single switch level.

In carrying out the principles of my invention I utilize two test wipers or brushes which may be the sleeve and hunt brushes of an XY type step-by-step switch, for example, provided in a selector. One of the test wipers is used to make the customary busy test of the trunks of a first group and the other test wiper is used to perform the busy test function in the second group of trunks. There is provided a transfer relay which operates on calls intended for the second group in order to transfer the busy test function from the first test wiper to the second test wiper.

In the preferred embodiment of my invention the sleeve leads of one group of trunks are connected to sleeve bank contacts and the unused contacts in the sleeve bank are grounded. The hunt leads of the other group of trunks are connected to the hunt bank contacts corresponding to two or more of the unused contacts in the sleeve bank and the unused hunt contacts are grounded.

The trunk hunting selector according to my invention is basically a two-digit trunk hunting system. If trunk hunting is desired in the first group of trunks, a special first digit is utilized to advance the switch to a level adapted for drop-back or digit absorption and the second digit is employed to advance the switch to the level in which the trunk groups terminate. Upon reaching the trunk level, hunting is initiated through the trunks of the first group and the first test wiper determines the idle or busy condition of the trunks in the first group.

If it is desired to carry out trunk hunting in the second group, a first digit which is different than the previous first digit, is dialed and absorbed. The second digit is the same as the above-mentioned second digit but the circuit arrangements are such that a transfer relay is operated upon the positioning of the switch at the level determined by the second digit in order to transfer the busy test function from the first wiper to the second wiper. Upon reaching the trunk level in response to the dialing of the second digit, the switch hunts through the trunks of the second group.

Thus the value of the first digit determines whether or not the transfer relay operates. If not, the sleeve brush tests for the idle or busy condition of the trunks in the first group. If the transfer relay operates after the first digit, the hunt brush determines the idle or busy condition of the trunks in the second group.

The circuit arrangements of my trunk hunting selector are such that trunk hunting in the second group may be carried out by dialing a single digit.

The features of my invention which I believe to be novel are set forth with particularity in the appended claims. My invention itself, both as to its organization and manner of operation, together with further objects and advantages thereof, may best be understood by reference to the following description taken in connection with the accompanying drawing in which Fig. 1 illustrates in block diagram form a system embodying the principles of my invention and Figs. 2, 3 and 4 illustrate the circuit arrangements of a trunk hunting selector according to my invention.

In Fig. 1 there is illustrated a digit transmitting device 1 which may be the conventional dial connected by means of suitable substation apparatus to a suitable line circuit 2. A finder 3, under the control of a suitable allotter 4 is provided for seizing a calling line. A selector 5 is connected to finder 3 for extending a call from device 1 at the calling subscriber's substation to various ranks of connectors or trunk groups. Thus in the arrangement shown, the selector switch indicated generally by the numeral 6 is provided with a plurality of levels indicated by the numerals 1 to 0, levels 2, 3, 5 to 8 and 0 terminating a plurality of connectors, while level 9 constitutes a single trunk group and level 4 terminates two trunk groups.

There follows a detailed description of the operation of my trunk hunting selector in extending calls to either the first or the second trunk group in the fourth level.

Figure 2:
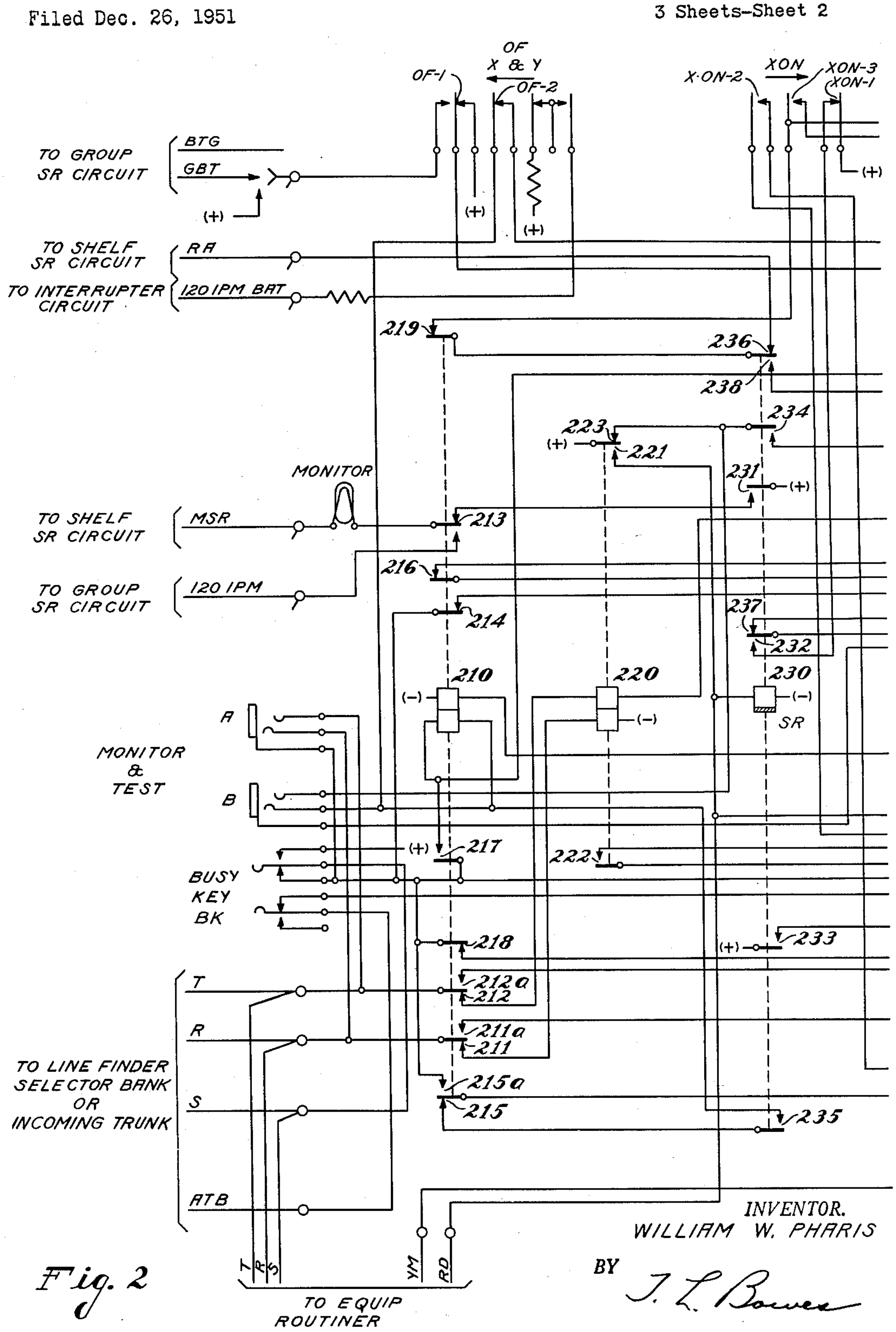
Figure 3:
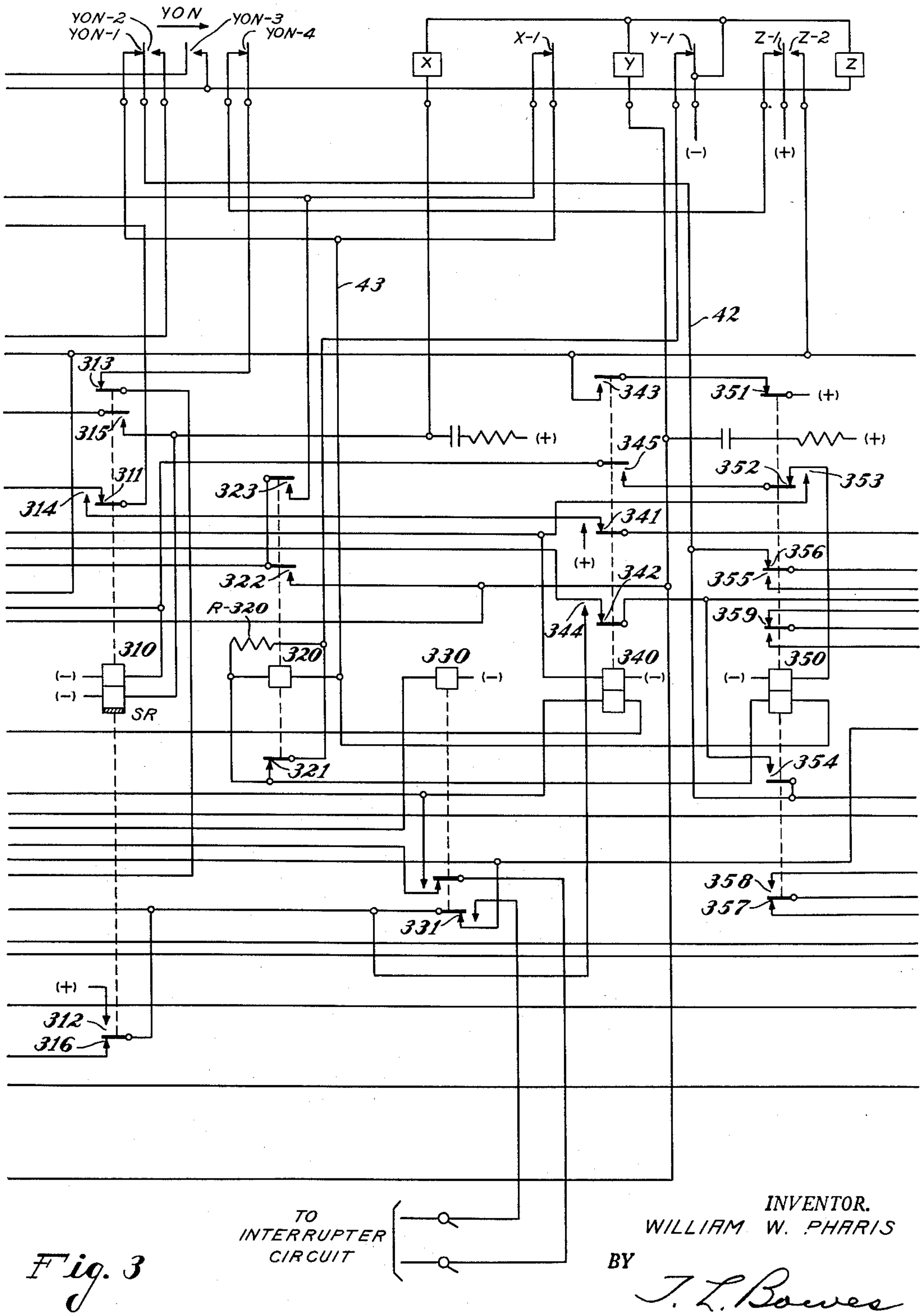

When the selector circuit, represented by Figs. 2 ,3 and 4, is seized, the preceding equipment closes a circuit to energize the calling bridge relay 220 over a circuit extending from battery, indicated by the symbol (−), through the lower winding of relay 220, contacts 211, ring lead R, preceding equipment including the subscriber' sloop, tip lead T, contacts 212, upper winding of relay 220, contacts 311 of X delay relay 310, and overflow contacts OF1 to ground, indicated by (+).

The operation of calling bridge relay 220 completes a circuit for energizing delay relay 230 over a circuit extending from battery through the winding of relay 230 and now operated contacts 221 to ground. The operation of relay 220 also prepares a circuit for operating the switching relay 210 at contacts 222.

The operation of relay 230 completes, at make contacts 231, a circuit for illuminating the lamp SL on the MSR lead in order to permit the lamp to light if a key in the associated equipment is thrown. Energization or operation of relay 230 also completes a circuit for energizing the delay relay 310 over a circuit extending from battery through the upper winding of relay 310, operated contacts 232, and X-off normal contacts XON–1 to ground. Operation of relay 230 also results in the application of ground to the back sleeve lead at make contacts 233 and normal contacts 331.

The operation of relay 310 results in the application of a multiple ground on the back sleeve lead S at contacts 312, that circuit extending from ground at contacts 312 by way of contacts 331 and busy key BK to back sleeve lead S; removes ground from the all-trunks-busy lead ATB at contacts 313; and replaces ground through the upper winding of relay 220 with grounded dial tone if so desired at operated contacts 314 by way of contacts 341 and the dial tone lead GDT. The system is now ready for dialing.

When the calling party dials the first digit of the called number, the loop over the tip and ring leads T and R, respectively, is interrupted in accordance with the dialed digit. The calling bridge relay 220 follows the impulses in the usual manner. Upon the first impulse of the series, relay 220 restores. Upon the opening of operated contacts 221, the energization circuit for relay 230 is broken but relay 230 remains operated during impulsing because of its slow-to-release characteristic. Upon the closure of normal contacts 223 a circuit is completed for energizing the stepping magnet X of a directively controlled switch SS*w* over a circuit extending from ground at normal contacts 223, through operated contacts 234, operated contacts 315, and stepping magnet X to battery. The release of relay 220 also completes a circuit for energizing the lower winding of X delay relay 310 by way of contacts 223, operated contacts 234, operated contacts 315, and the lower winding of relay 310 to battery. The stepping magnet X operates and the switch SS*w* takes its first step.

When switch SS*w* moves off its normal position, the X off normal contacts or springs XON operate and open the upper or starting winding of X-delay relay 310 at X off normal springs XON–1. Relay 310 remains operated during the series of impulses, however, because of its slow-to-release characteristic. Upon conclusion of the first impulse, relay 220 reoperates, thereby opening the circuit to the lower winding of relay 310 at contacts 223, and also opens the circuit for advancing the stepping magnet X at the same pair of contacts, thereby permitting the X magnet to restore. The reoperation of relay 220 also recloses the circuit for energizing relay 230 at contacts 221. The switch SS*w* follows the remaining impulses of the first digit in the manner described above. At the conclusion of the first digit, relay 220 remains operated, thereby opening the circuit for relay 310 which restores after a brief interval. The restoration of relay 310 removes dial tone at contacts 314.

The selector circuit disclosed in detail in Figs. 2, 3 and 4 is arranged for hunting in the level reached by switch SS*w* during its motion in the primary or X direction. Assume that SS*w* now stands at its fifth level. The release of relay 310 completes a circuit for energizing hunt assist relay 320 over a circuit extending from ground at operated contacts 233 by way of normal contacts 316, operated off normal contacts XON–2 to the XX wiper, fifth XX contact, conductor 41, conductor 42, Y off normal contacts YON–1, conductor 43, winding of relay 320, normal contacts 321 and resistor R320 in parallel and Y interrupter springs Y–1 to battery. Relay 320 operates to open its contacts 321, relay 320 remaining energized or operated, however, by way of resistor R320. The operation of relay 320 also completes a circuit for energizing the secondary stepping magnet Y over a circuit extending from ground on the back sleeve S, through busy key BK, normal contacts 214, operated contacts 322, and magnet Y to battery, whereupon the switch SS*w* takes its first step in the secondary or Y direction. The hunt assist relay 320 remains operated from ground over back sleeve lead S, busy key BK, normal contacts 214, operated contacts 323, X interrupter springs X–1, winding of relay 320, resistor R320, and Y magnet interrupter springs Y–1 to battery. Upon the first step in the secondary or Y direction, the Y off normal contacts or springs operate, thereby opening the holding circuit to relay 320 at the Y off normal springs YON–1 so that relay 320 restores and recloses normal contacts 321 and opens the circuit for energizing the magnet Y at contacts 322. The Y magnet restores.

The wipers T′, R′, S′, and HS′ of step switch SS*w* now engage the first contacts in the level to which the switch has advanced. The sleeve brush S′ is arranged to determine the busy or idle condition of the trunk or other connection to the first position in the level. In conventional manner, ground on the sleeve contacts may be used to indicate a busy condition. Inasmuch as ground to indicate a busy condition is a conventional arrangement, means for providing that ground is not shown. It is believed sufficient to indicate that ground is connected back over the wiper S′ through normal contacts 411, normal contacts 215, operated contacts 235, overflow contacts OF–2, interrupter springs X–1 to the winding of relay 320. The other terminal of the winding of relay 320 is connected through normal contacts 321 and Y magnet interrupter springs Y–1 to battery. This circuit results in the re-energization of relay 320. In turn, the reoperation of relay 320 recloses the circuit for energizing the stepping magnet Y over the previously described circuit through make contacts 322, opening its energizing circuit at normal contacts 321, and extending back sleeve ground over normal contacts 214 in order to hold switching relay 210 short circuited while the switch makes the next step.

In response to the completion of the above-described circuit, stepping magnet Y reoperates, thereby moving the wiper switch SS*w* to the second step. Again, as previously described, the Y interrupter springs open the circuit for maintaining relay 320 operated. The release of relay 320 again results in the restoration of stepping magnet Y as described above. This sequence of operation continues until idle succeeding equipment has been found or the switch SS*w* steps into the overflow position.

If idle succeeding equipment has been found, absence of ground in the S bank removes the previously described short circuit from switching relay 210. Relay 210 thus operates from battery by way of the Y magnet interrupter springs Y–1, normal contacts 321, winding of relay 320, X magnet interrupter springs X–1, off normal springs OF–2, lower winding of relay 210, operated off normal springs YON–2, conductor 42, conductor 41 ("M" wiring), XX bank, XX brush or wiper, operated off normal contacts XON–2, normal contacts 316, normal contacts 331 and busy key BK to back sleeve lead S. Relay 320 does not operate at this time over this series circuit because of insufficient current flow.

The operation of relay 210 results in the completing of a holding path for relay 210 through the upper winding of relay 210, lower winding of relay 340, and operated contacts 221 to ground; opens the circuit to calling bridge relay 220 at normal contacts 211 and 212; switches the tip and ring leads T and R through to the brushes T′ and R′ of switch SS*w* at operated contacts **212*a* and 211*a*, respectively; and places ground on the sleeve wiper S′ to make the succeeding equipment busy at operated contacts 215*a*, normal contacts 331, and operated contacts 233**.

The release of relay 220 opens the holding circuits for delay relay 230 and switching relay 210 at contacts 221 and after a time delay, since relay 230 has slow-to-release characteristics, relay 230 restores or releases. The consequent opening of contacts 233 results in the removal of ground from the sleeve lead S, but the preceding equipment is now held from ground over sleeve lead and brush S′, normal contacts 411, operated contacts **215*a*, busy key BK and sleeve lead S. Relay 210 holds operated through its operated contacts 217** and the described sleeve holding ground.

The sequence of events upon release of the call is next described. When the succeeding equipment is released to the extent that ground is removed from the front sleeve lead, the removal of ground results in the de-energization of switching relay 210 which thereupon restores. The release of relay 210 opens the tip and ring leads to the succeeding equipment at contacts **212*a* and 211*a*, respectively; closes a circuit for operating release magnet Z over a circuit extending from battery through release magnet Z, off normal contacts YON–3 and XON–3 in parallel, normal contacts 219, normal contacts 236 to ground on the RA lead; and disconnects the sleeve lead S from the sleeve wiper S′ at contacts 215*a***.

The operation of release magnet Z allows the switch SS*w* to return to normal. The operation of the Z springs Z–2 upon energization of magnet Z opens a circuit to relay 210 to prevent its reoperation; and completes a circuit for reoperating X delay relay 310 over a circuit extending from ground at release magnet springs Z–2 through normal contacts 237 and the upper winding of relay 310 to ground.

The reoperation of relay 310 causes ground to be placed on the back sleeve S by way of operated contacts 312, normal contacts 331 and busy key BK in order to prevent seizure of the selector during the release period. When the switch SS*w* returns to normal, the X and Y off normal springs restore resulting in the opening the energizing circuit to the magnet Z. Upon restoration to normal of magnet Z, the Z springs restore and place ground on the all-trunk-busy lead ATB and open the circuit to relay 310. Thereupon, relay 310 restores and removes ground from the back sleeve lead S and makes the selector switch available to other calls.

In the circuit shown in the drawings, several different arrangements are shown for providing digit canceling with or without reuse of the level corresponding to the canceled digit. One such arrangement which involves cancellation or absorption of the first digit at all times without the reuse of the level is illustrated by providing connections indicated as "W" wiring. In Fig. 4, for example, the first contact in the XX bank is designated "W" wiring. If it now be assumed that the switch SS*w* has been impulsed to the first level, i. e., to the level on which digit absorbing takes place, the XX wiper forwards ground from the back sleeve lead S by way of sleeve lead S, busy key BK, normal contacts 331, normal contacts 316, X off normal springs XON–2 to the XX brush. A parallel ground is provided by way of operated contacts 233 at normal contacts 316. Ground at the XX wiper is carried through the XX bank, "W" wiring, operated contacts 238, normal contacts 219, X off normal contacts XON–3 through the release magnet Z to battery.

It will be recalled that relay 310 releases a short time after the completion of the primary movement of the switch. The release of relay 310 and consequent closure of contacts 316 causes release magnet Z to operate and the switch is returned to normal. Upon the energization of magnet Z the release magnet springs Z–2 are closed to forward ground through operated contacts 238, normal contacts 219, X off normal springs XON–3 and the release magnet Z to battery in order to maintain operated the release magnet until the switch returns to normal. When the switch returns to normal, the off normal springs open the circuit to the release magnet Z, allowing the release magnet to restore. The release magnet and its operated springs then restore and the switch continues to function as previously described.

Another arrangement involving digit canceling provides for the cancellation of the first digit with the resue of the level. For this purpose the "N" wiring is used. In Fig. 4 the "N" wiring is illustrated as being connected to the eighth contact in the XX bank. Under this arrangement, if switch SS*w* has been impulsed to the eighth level, the XX wiper forwards ground through the XX bank, "N" wiring, normal contacts 342, normal contacts 216, and the upper winding of relay 340. Again, it is to be noted that the above path back to sleeve ground includes normal contacts 316 of relay 310 and cancellation thereby depends upon the release of relay 310 following the halting of the primary movement.

As soon as the switch reaches the eighth contact and relay 310 releases, relay 340 operates from ground through normal contacts 316. The operation of relay 340 results in the extension of ground at normal contacts 351 through operated contacts 343, operated contacts 238, normal contacts 219, X off normal contacts XON–3 and release magnet Z to battery; and completes a holding circuit for relay 340, the circuit extending from ground at operated contacts 233 through operated contacts 344, normal contacts 216 and upper winding of relay 340 to battery. The foregoing circuit results in the operation of release magnet Z and the switch returns to normal in the manner described in connection with the cancellation of the first digit without reuse of level.

With this arrangement, however, upon restoring, the off normal springs close a circuit from ground for operating relay 350, the circuit extending from ground at off normal springs XON–1 by way of operated contacts 232, operated contacts 345, normal contacts 352, and upper winding of relay 350 to battery. Relay 350 operates and at its contacts 354 prepares an operating path for relay 320 from the XX bank by way of the "N" wiring, operated contacts 354, Y off normal springs YON–1 to the winding of relay 320 in order to cause the switch SS*w* to step in the Y direction at the end of the next series of impulses. The operation of relay 350 also closes a holding circuit for that relay through operated contacts 353. The selector circuit is now prepared for the receipt of the next digit.

Again referring to Fig. 4, there is also provided "Q" wiring, according to which switch SS*w* either proceeds to hunt in the secondary or Y direction without dropback or digit canceling or absorbs the digit depending upon whether the level corresponding to the "Q" wiring is dialed as the first digit or the second digit of a given series of digits. Inspection of Fig. 4 reveals that the "Q" wiring shown connected to the ninth level is also connected by the "M" wiring, conductors 41, 42 and normal contacts 356 to the fifth contact in the XX bank so that under any condition in which relay 350 remains unoperated, the "Q" wiring functions in the same manner as the "M" wiring. Since the "M" wiring is the standard selector operation, i. e., directive control by dial impulses in the primary direction and hunting in the secondary direction, if the first impulse is such as to leave relay 350 de-energized, hunting follows the motion of the switch SS*w* to the ninth level of the switch. If, however, the first digit has been absorbed, as by use of the "N" wiring, relays 340 and 350 will have been operated, the latter having been operated upon the return of switch SS*w* to normal following the absorption of the previous digit and normal contact 356 will have opened the connection between the "Q" wiring and the "M" wiring. With relay 350 operated, the "Q" wiring is connected through operated contacts 355 to the "W" wiring and the operation of the circuit then proceeds in the same manner as described above in connection with the "W" wiring.

In accordance with my invention, means is provided for terminating first and second trunk groups on a single level of the switch SS*w* and hunting within each group is provided. Thus, referring to the lower right hand portion of Fig. 4 there is shown the contacts or terminals for the fourth level of the switch SS*w*. Referring to the sleeve bank, it is noted that the first trunk group comprises the first five terminals and the remaining terminals are connected to ground. Now referring to the hunt bank, the first five terminals are grounded and the second five terminals constitute the second trunk group of the fourth level. In connection with the two-trunk per level arrangement, there is provided "R" wiring and "Z" wiring, the "R" wiring being indicated as connected to the tenth contact of the XX bank and the "Z" wiring to the fourth contact of the XX bank.

In accordance with my invention, in order to search or hunt through the first trunk group, it is necessary to dial a digit which will cause switch SS*w* to advance to a level represented by the "N" wiring, i. e., the eighth level in the present example, and then to dial a digit corresponding to a level equipped with "Z" wiring, i. e., the fourth level. However, trunk hunting in the second trunk group may be accomplished by dialing one or two digits. If it is desired to employ two digits, it is necessary first to dial the "R" wiring level, i. e., the tenth level in the illustrated embodiment and then to dial the "Z" wiring or fourth level. Alternatively hunting may be achieved by simply dialing the fourth level or "Z" wiring by means of a single digit.

The foregoing objects are accomplished by providing a transfer relay 410 for transferring the busy test from the first test wiper or sleeve brush S′ to the second test wiper or brush HS′ at contacts 412 and to provide a digit absorbing relay 420.

*Searching first trunk group*

If it be assumed that it is desired to reach a trunk in the first trunk group, in the arrangement shown, the subscriber first dials the numeral "8" and then dials the numeral "4" in the circuit arrangement shown in Fig. 4. In response to the dialing of the digit "8" and the motion of switch SS*w* to the eighth level, the brushes or wipers T′, R′, S′ and HS′ stand opposite the eighth level and the auxiliary brush XX has moved into the XX bank to a position corresponding to the selected switch level. The XX wiper forwards ground from the back sleeve lead S by way of busy key BK and normal contacts 331 in parallel with operated contacts 233 through normal contacts 316, X off normal contacts XON–2, auxiliary brush XX, eighth auxiliary contact in the XX bank, "N" wiring, normal contacts 342, normal contacts 216 and upper winding of digit absorbing relay 340 to battery whereupon, after relay 310 restores at the end of the digit, relay 340 operates.

The operation of relay 340 completes a circuit for operating the release magnet Z over a circuit extending from ground at normal contacts 351 through operated contacts 343, operated contacts 238, normal contacts 219, X off normal contacts XON–3 and the release magnet Z to battery. A holding circuit is also established for maintaining relay 340 operated from sleeve ground or ground through operated contacts 233, operated contacts 344, normal contacts 216 and upper winding of relay 340.

Upon the completion of the energizing circuit for the release magnet Z, the release magnet operates and the switch returns to normal as previously described. In response to the restoration of the switch SS*w*, the X off-normal springs close a circuit from ground at X off normal contacts XON–1 through operated contacts 232, operated contacts 345, normal contacts 352 and the upper winding of auxiliary hunt assist relay 350 to battery.

Responsive to the operation of relay 350, there is prepared at contacts 354 an operating path for relay 320, the circuit extending from ground at the XX bank through the "N" wiring, operated contacts 354, Y off normal contacts YON–1, winding of relay 320, normal contacts 321, and Y interrupter springs Y–1 to battery. At this stage, it may be noted that if the next digit dialed is the same digit, i. e., 0, the switch is prepared to step in the Y direction on the next series of impulses.

Referring again to the operation of relay 350, a holding circuit is completed for relay 350 from sleeve ground by way of operated contacts 344, normal contacts 316 and operated contacts 353 to the upper winding of relay 350.

Now upon the dialing of the digit "4" ("Z" wiring) switch SS*w* is advanced to the fourth level whereupon a circuit is completed from ground on the XX brush through the fourth terminal, "Z" wiring, normal contacts 413, operated contact 358, normal contacts 421, Y off normal contacts YON–1, winding of relay 320, normal contacts 321 and Y interrupter contacts Y–1 to battery, thereby energizing relay 320. As previously described in connection with the hunting action of the switch SS*w*, the brushes advance into the fourth level. As previously described under the normal operation of the switch, if ground is encountered on the terminals of the first trunk group, the switch is caused to advance to the next trunk until an idle trunk is found (at which time switching relay 210 causes the switching through operation) or until the S′ brush reaches the grounded terminals corresponding to the second trunk group for advancing the switch to overflow.

*Searching second trunk group*

It is next assumed that searching is desired in the second trunk group corresponding to contacts 6 to 10 of the fourth level of the switch SS*w*. This result may be accomplished by dialing in such a manner as to advance the brush sets to engage the "R" wiring. In Fig. 4 this involves dialing the digit "0" in order to advance the switch to the tenth level.

With the XX brush on the tenth contact, a circuit is completed extending from the previously described ground on the XX brush through the XX bank, "R" wiring, normal contacts 359, normal contacts 422 and winding of relay 420 to battery, thereby operating digit absorbing relay 420. Upon the operation of relay 420 a locking circuit is completed from battery through the winding of relay 420, operated contacts 423, normal contacts 218 to sleeve ground and completes a circuit for operating relay 340 over a circuit extending from ground on the XX brush, the tenth terminal in the XX bank, "R" wiring, operated contacts 424, normal contacts 342 and 216 and upper winding of relay 340 to battery. It might be noted at this point that the closure of contacts 424 of relay 420 also connects the "N" wiring with the "R" wiring and hence operation and digit absorption is the same as described previously in connection with the "N" wiring. Thus, the operation of relay 340 effects the energization of release magnet Z over a circuit extending from battery at release magnet Z by way of X off normal contacts XON–3, normal contacts 219, operated contacts 238, operated contacts 343, and normal contacts 351 to ground. Thereupon, the release magnet Z operates and the switch SS*w* returns to normal. As previously described, the closure of the release springs Z–2 completes a circuit from ground over the previously traced release circuit and release contact Z–2 in order to hold the release magnet operated until the switch has fully restored. Upon the restoration of the switch the X off normal springs open the circuit to the release magnet allowing the release magnet to restore.

Upon the restoration of the switch a circuit is completed for operating relay 350 over a circuit extending from battery through the upper winding of relay 350, normal contacts 352, operated contacts 345, operated contacts 232, and X off normal springs XON–1 to ground. The circuit is then prepared for the dialing of the next digit.

Under the assumed condition the next digit should be of such value as to cause the XX brush to advance to the fourth terminal in the XX bank in order to engage the "Z" wiring. Under this condition, a circuit is completed from ground on the XX brush through the fourth terminal in the XX bank, normal contact 413, operated contacts 358 and 425, and winding of transfer relay 410 to battery. Relay 410 is provided with a preliminary make or "X" contact 415 which makes before the other contacts of relay 410 are operated, and thereby completes a holding circuit extending from battery through the winding of relay 410, now operated contacts 415 to sleeve ground on back sleeve S. The completion of the operation of relay 410 results in the closure of contacts 412 which effects a transfer of the back sleeve lead S through operated contacts 412 to the HS′ brush and thus, responsive to the operation of transfer relay 410, the busy test function is transferred from the first test wiper S′ to the second test wiper HS′.

Now referring to the previous operation of relay 350, it will be understood that the closure of contacts 354 prepared an operating path for hunt assist relay 320 from the XX bank by way of the "Z" wiring, operated contacts 414, conductor 42, Y off normal springs YON–1, winding of relay 320, normal contacts 321 and Y interrupter springs Y–1 to battery. Upon the operation of relay 320, the Y magnet is caused to operate the switch SS*w* one step in the secondary or Y direction over a circuit extending from battery through the secondary direction magnet Y, operated contacts 322, and normal contacts 214 to sleeve ground at busy key BK. Upon reaching the first contact in the fourth level, the HS′ brush engages a grounded contact which simulates a busy contact and the previously described operation under busy conditions follows. Thus, the switch SS*w* is stepped to the sixth contact. If the sixth contact represents an idle trunk, the switch will be halted as previously described and the circuit switched through. However, if the sixth contact represents a busy trunk, the switch again steps to the next terminal and the stepping operation continues until an idle trunk is located in the second trunk group or the switch reaches overflow.

At this point is should be noted that if the second digit had been the same as the first digit for example, the switch could immediately cut through and hunt by the interaction of hunt relay 320 and the stepping magnet Y.

With the circuit arrangement shown in Figs. 2, 3 and 4, it is not necessary to dial two digits in order to search in the second group. Let it now be assumed that the subscriber dials the digit "4" without previously dialing a digit such as the digit "O" as previously discussed.

In this case, relays 340, 350 and 420 remain unoperated and ground is extended on the XX brush through the fourth contact of the XX bank and "Z" wiring, normal contacts 413 and 357 to the transfer relay 410 which operates to transfer the back sleeve lead S from the S' brush to the HS' brush at now operated contacts 412. Hunting over the fourth level then proceeds in the previously described fashion by the interaction of relay 320 and the stepping magnet Y.

Thus, there is provided in accordance with my invention an arrangement in which hunting may be accomplished in two trunk groups incorporated in a single level of the selector switch. The first group of trunks is reached by dialing two digits, the first digit being for the purpose of directing the switch to a level adapted for dropback or digit absorption, and the second being a digit corresponding to the level in which the first group is found. A second group is reached in the embodiment of my invention shown in the drawing by (1) dialing two digits, the first being absorbed and the second corresponding to the level including the second group, or (2) by dialing a single digit corresponding to the level including the second group.

While I have shown and described a particular embodiment of my invention, it will be obvious to those skilled in the art that changes and modifications may be made without departing from my invention in its broader aspects. I, therefore, aim in the appended claims to cover all such changes and modifications as fall within the true spirit and scope of my invention.

What I claim is:

1. In a telephone system, a directively controlled switch having a first test wiper, a second test wiper, a contact bank having a plurality of levels of contacts accessible to said test wipers, means for moving said wipers to engage certain of said contacts, a first group of trunks and a second group of trunks terminating in one level of said bank, an impulse transmitting device, means utilizing said device for transmitting a first digit to cause said switch to move to a second level of bank contacts, a first relay, means responsive to the positioning of said switch at said second level for operating said first relay, means responsive to the operation of said first relay for causing said switch to return to its normal position, a second relay means responsive to the return of said switch to normal for operating said second relay, means utilizing said device for transmitting a second digit to cause said switch to move to said one level, means responsive to the positioning of said switch at said one level and the operation of said second relay for causing said test wipers to move into said one level, means utilizing said first test wiper for making a busy test on the trunks of said first group, means utilizing said second test wiper for making a busy test on the trunks of said second group, and means for transferring the busy test function from said first test wiper to said second test wiper to effect the busy test function in said second group.

2. In a telephone system, a directively controlled switch having first and second test wipers, a contact bank having a plurality of levels of contacts accessible to each of said test wipers, first and second groups of trunks terminating in one level of said bank, a digit transmitting device, means for trunk hunting in said first trunk group, the last-mentioned means including said device for causing said switch to move to a second level of said bank contacts upon the receipt of a predetermined first digit, means for trunk hunting in said second trunk group, the last-mentioned means including said device for causing said switch to move to a third level of said bank contacts upon the receipt of another predetermined first digit, first and second digit absorbing relays, means responsive to the advance of said switch to said third level for operating the first digit absorbing relay, means responsive to the operation of said first relay for operating said second digit absorbing relay, means responsive to the operation of said second digit absorbing relay for causing said switch to return to its normal position, an auxiliary hunt assist relay, means responsive to the restoration of said switch for operating said auxiliary hunt assist relay, means responsive to a second predetermined digit for causing said switch to advance to said one level, means responsive to the operation of said auxiliary hunt assist relay and the positioning of said switch at said one level for causing said switch to advance into said one level, and means utilizing said second test wiper for determining the idle or busy condition of said second group of trunks.

3. In a telephone system, a directively controlled switch having first and second test wipers, a contact bank having a plurality of levels of contacts accessible to each of said test wipers, first and second groups of trunks terminating in one level of said bank, a digit transmitting device, means for trunk hunting in said first trunk group, the last-mentioned means including said device for causing said switch to move to a second level of said bank contacts upon the receipt of a predetermined first digit, means for trunk hunting in said second trunk group, the last-mentioned means including said device for causing said switch to move to a third level of said bank contacts upon the receipt of another predetermined first digit, first and second digit absorbing relays, means responsive to the advance of said switch to said third level for operating the first digit absorbing relay, means responsive to the operation of said first relay for operating said second digit absorbing relay, means responsive to the operation of said second digit absorbing relay for causing said switch to return to its normal position, an auxiliary hunt assist relay, means responsive to the restoration of said switch for operating said auxiliary hunt assist relay, means responsive to a second predetermined digit for causing said switch to advance to said one level, means responsive to the operation of said auxiliary hunt assist relay and the positioning of said switch at said one level for causing said switch to advance into said one level, a transfer relay having a set of normally open contacts, means responsive to the positioning of said switch at said one level for operating said transfer relay, a busy test circuit, and means for connecting said second test wiper through said contacts of said transfer relay to said busy test circuit whereby said second test wiper tests the idle or busy condition of said second group of trunks.

References Cited in the file of this patent

UNITED STATES PATENTS

| | | |
|---|---|---|
| 2,190,140 | Taylor et al. | Feb. 13, 1940 |
| 2,249,067 | Wadsworth | July 15, 1941 |
| 2,262,446 | Beale et al. | Nov. 11, 1941 |
| 2,575,780 | Balzer | Nov. 20, 1951 |
| 2,617,887 | Taylor | Nov. 11, 1952 |
| 2,635,147 | Stehlik | Apr. 14, 1953 |